(12) United States Patent
Mizui et al.

(10) Patent No.: US 6,721,347 B2
(45) Date of Patent: Apr. 13, 2004

(54) SOLID STATE LASER APPARATUS

(75) Inventors: Jyunichi Mizui, Yokohama (JP); Susumu Miki, Takasago (JP); Masahiro Kato, Takasago (JP); Takashi Akaba, Kobe (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 29 days.

(21) Appl. No.: 09/926,776

(22) PCT Filed: Apr. 16, 2001

(86) PCT No.: PCT/JP01/03218

§ 371 (c)(1), (2), (4) Date: Dec. 18, 2001

(87) PCT Pub. No.: WO01/80382

PCT Pub. Date: Oct. 25, 2001

(65) Prior Publication Data

US 2002/0136257 A1 Sep. 26, 2002

(30) Foreign Application Priority Data

Apr. 18, 2000 (JP) .................................. 2000-116335

(51) Int. Cl.$^7$ ............................ H01S 3/091; H01S 3/094
(52) U.S. Cl. ............................ 372/75; 372/70; 372/107
(58) Field of Search ............................ 372/75, 70, 107

(56) References Cited

U.S. PATENT DOCUMENTS

| | | | | |
|---|---|---|---|---|
| 5,307,430 A | * | 4/1994 | Beach, Raymond J. et al. | 385/31 |
| 5,515,394 A | * | 5/1996 | Zhang | 372/72 |
| 5,646,773 A | * | 7/1997 | Injeyan et al. | 359/337 |
| 6,269,111 B1 | * | 7/2001 | Mori et al. | 372/92 |
| 6,560,397 B1 | * | 5/2003 | Ehlers et al. | 385/146 |
| 2002/0097769 A1 | * | 7/2002 | Vetrovec | 372/75 |

FOREIGN PATENT DOCUMENTS

| | | |
|---|---|---|
| EP | 0902511 | 3/1999 |
| JP | 05-021869 | 1/1993 |
| JP | 05-090670 | 4/1993 |
| JP | 06-310782 | 11/1994 |
| JP | 11-214776 | 8/1999 |

* cited by examiner

*Primary Examiner*—Paul Ip
*Assistant Examiner*—Leith Al-Nazer
(74) *Attorney, Agent, or Firm*—Oblon, Spivak, McClelland, Maier & Neustadt, P.C.

(57) ABSTRACT

Laser light emitted from an LD apparatus is concentrated and applied onto a laser light path region A of a slab-shaped YAG crystal 21 and the neighborhood thereof with the use of a concave lens and a pair of reflecting mirrors, a duct lens, or a plurality of cylindrical lenses, whereby a concentrated applied light intensity distribution in the side surface width direction (y-axis direction) of the slab-shaped YAG crystal is formed as a double-peak distribution having maximum values $P_1$ and $P_2$ at opposite end portions $A_1$ and $A_2$ of the laser light path region of the slab-shaped YAG crystal or in the neighborhoods thereof.

5 Claims, 14 Drawing Sheets

Double-Peak Excitation (16mm Width)
Temperature Distribution (a)

20mm

Refractive Index Distribution (b)

Light Applied Only to 11 mm Width
Temperature Distribution (a)

Refractive Index Distribution (b)

SOLID STATE LASER APPARATUS

TECHNICAL FIELD

This invention relates to a solid state laser apparatus, which is useful when applied, for example, as a semiconductor laser excited YAG laser apparatus for use in material processing, such as drilling, cutting or welding, and surface treatment, such as surface modification or marking.

BACKGROUND ART

Currently, a semiconductor laser (laser diode; may hereinbelow be referred to as LD) apparatus attracts attention as an exciting light source of a solid state laser apparatus such as a YAG laser apparatus. This LD apparatus generates semiconductor laser light from an LD device, and is excellent in oscillation efficiency and life as compared with a conventional pumping lamp.

FIG. 14 is a perspective view showing the configuration of a conventional LD-excited YAG laser apparatus. As shown in this drawing, a YAG laser apparatus 11 has a pair of LD apparatuses 2 as an exciting light source, and these LD apparatuses 2 are disposed so as to be opposed to both side surfaces 1a and 1b of a slab-shaped YAG crystal (hereinafter referred to simply as a crystal). An output mirror 3 and a total reflection mirror 4 are provided parallel on one side in the longitudinal direction (x-axis direction) of the crystal 1, while a turnback total reflection mirror 5 and a turnback total reflection mirror 6 are provided parallel on the other side in the longitudinal direction of the crystal 1. These mirrors 3, 4, 5 and 6 constitute a resonator. The illustrated example shows a YAG laser light path in the crystal as two axes, a YAG laser light path 10a and a YAG laser light path 10b.

The LD apparatus 2 comprises many cooling blocks 8 stacked in the x-axis direction, each of the cooling blocks 8 having an LD device 7 fixed to the side surface thereof. The LD device 7 used here comprises several tens of active media arranged one-dimensionally (i.e., a one-dimensional LD array device), each of the active media having a cross sectional area of several micrometers×several hundred micrometers. The LD devices 7 are stacked, together with the cooling blocks 8, to constitute a two-dimensional LD array device. By flowing a drive current in the stack direction of the cooling blocks 8 by a power source device (not shown), laser light 9 is emitted from the respective LD devices 7, and this laser light 9 is directed, as exciting light, at the opposite side surfaces 1a and 1b of the crystal 1. As a result, YAG laser light 10 is issued from the output mirror 3 of the resonator.

At this time, the YAG laser light paths 10a, 10b in the crystal are zigzag optical paths, in which laser light advances in the x-axis direction while being reflected by the opposite side surfaces 1a and 1b in the thickness direction (z-axis direction) of the crystal 1, because the entrance and exit of the crystal 1 (the opposite end surfaces in the x-axis direction) have Brewster's angle. Thus, even if a temperature distribution occurs in the z-axis direction inside the crystal and a refractive index distribution according to this temperature distribution occurs, a thermal lens effect due to this phenomenon is compensated for.

For the refractive index distribution in the y-axis direction, on the other hand, the thermal lens effect is not compensated for. Thus, the refractive index distribution in the y-axis direction needs to be uniformized in the laser light path region. With the above-described conventional YAG laser apparatus 11, however, a refractive index distribution occurs also in the y-axis direction within the crystal, because laser light 9 from the LD apparatus 2 is uniformly thrown at the entire side surface of the crystal 1 by adjusting the distance between the LD apparatus 2 and the crystal 1.

That is, when laser light 9 is uniformly applied to the whole of the crystal side surfaces 1a and 1b, the applied light intensity distribution in the y-axis direction on these crystal side surfaces 1a and 1b is uniform all over the side surface as indicated by a solid line in FIG. 15(a). The applied light intensity tends to be low at the upper and lower ends of the crystal side surfaces 1a and 1b. Thus, the temperature distribution in the y-axis direction within the crystal is a distribution having a maximum value at the crystal center portion as indicated by a solid line in FIG. 15(b), because of heat conduction in the diametrical direction (y-axis direction) of a cross section of the laser light path. Hence, the refractive index distribution in the y-axis direction within the crystal is also a nonuniform distribution, as shown in FIG. 15(c), in accordance with this temperature distribution.

Consequently, owing to the thermal lens effect, YAG laser light 10 is condensed or contorted in the YAG laser light paths 10a, 10b within the crystal, resulting in a deterioration of light quality. Condensation of the YAG laser light 10 within the crystal may make the diameter of the YAG laser light 10 smaller than a predetermined diameter. The decrease in the diameter of the YAG laser light 10 may lower the oscillation efficiency, or may further burn out the crystal 1.

In the applied light intensity distribution shown in FIG. 15(a), a portion contributing to optical excitation of the laser medium doped into the crystal 1 is only a region A of the two YAG laser light paths 10a and 10b, and the other portion is of no use. In other words, the applied light density in the laser light path region A is low. Thus, the utilization efficiency of the semiconductor laser light 9 is poor, and the semiconductor laser output is great relative to the necessary YAG laser output. The portion other than the laser light path region A in the crystal 1 is a portion necessary as a mechanism for cooling and maintaining the crystal 1, and necessary for the optical axis adjustment of the YAG laser light 10.

Thus, the present invention has been accomplished in light of the foregoing problems, and is aimed at providing a solid state laser apparatus having a high utilization efficiency of semiconductor laser light, and being capable of uniformizing the refractive index distribution in the width direction of side surfaces of a slab-shaped crystal in the laser light path region of the slab-shaped crystal.

DISCLOSURE OF THE INVENTION

The solid state laser apparatus of the present invention, which attains the above object, is characterized by the following features:

1) A solid state laser apparatus having an LD apparatus as an exciting light source, and adapted to direct laser light emitted from the LD apparatus, as exciting light, at the side surface of a slab-shaped crystal to emit solid state laser light, comprising:
    light concentrating/applying means for concentrating and applying the laser light emitted from the LD apparatus onto a laser light path region of the slab-shaped crystal, or the laser light path region and the neighborhood thereof.

According to this invention, semiconductor laser light is concentrated and applied onto the laser light path region, or the laser light path region and its neighborhood. Thus, the utilization efficiency of the semiconductor laser light is increased, and when the same solid state laser output as before is to be obtained, the semiconductor laser output (input to the crystal) can be made smaller than before. In other words, when the same semiconductor laser output as before is given, a greater solid state laser output than before can be obtained.

2) In the solid state laser apparatus,
   the light concentrating/applying means concentrates and applies the laser light such that a concentrated applied light intensity distribution in the side surface width direction of the slab-shaped crystal is a double-peak distribution.

According to this invention, compared with mere concentration and application of laser light, the temperature distribution in the side surface width direction within the crystal can be made uniform, and the refractive index distribution can also be made uniform. Consequently, the condensation or contortion of solid state laser light with the crystal due to the thermal lens effect can be prevented, and the quality of solid state laser light can be improved.

3) A solid state laser apparatus having an LD apparatus as an exciting light source, and adapted to direct laser light emitted from the LD apparatus, as exciting light, at the side surface of a slab-shaped crystal to emit solid state laser light, comprising:
   light concentrating/applying means for concentrating and applying the laser light emitted from the LD apparatus onto a laser light path region of the slab-shaped crystal and the neighborhood thereof, and for forming a concentrated applied light intensity distribution in the side surface width direction of the slab-shaped crystal as a double-peak distribution having maximum values at opposite end portions of the laser light path region of the slab-shaped crystal, or in the neighborhoods thereof.

According to this invention, semiconductor laser light is concentrated and applied onto the laser light path region and its neighborhood. Thus, the utilization efficiency of the semiconductor laser light is increased, and when the same solid state laser output as before is to be obtained, the semiconductor laser output (input to the crystal) can be made smaller than before. In other words, when the same semiconductor laser output as before is given, a greater solid state laser output than before can be obtained.

Furthermore, the concentrated applied light intensity distribution in the side surface width direction of the crystal is formed as a double-peak distribution having the maximum values at the opposite end portions of the laser light path region of the crystal, or in their neighborhoods. Thus, the temperature distribution in the side surface width direction within the crystal is a uniform distribution in the laser light path region. According to this temperature distribution, the refractive index distribution in the side surface width direction within the crystal is also a uniform distribution in the laser light path region. Consequently, the solid state laser light is prevented from being condensed or contorted in the solid state laser light paths within the crystal owing to the thermal lens effect, so that the quality of the solid state laser light is improved.

4) A solid state laser apparatus having an LD apparatus as an exciting light source, and adapted to direct laser light emitted from the LD apparatus, as exciting light, at the side surface of a slab-shaped crystal to emit solid state laser light, comprising:
   a concave lens for diffusing the laser light emitted from the LD apparatus in the side surface width direction of the slab-shaped crystal; and
   a pair of reflecting mirrors disposed such that the reflecting surfaces thereof are opposed to each other in the side surface width direction, and that the spacing between the reflecting surfaces in the side surface width direction gradually narrows from base end portions of the reflecting mirrors facing the concave lens toward front end portions of the reflecting mirrors facing the slab-shaped crystal and, at front end portions of the reflecting mirrors, becomes a spacing corresponding to a laser light path region of the slab-shaped crystal and the neighborhood thereof, and wherein
   the laser light emitted from the LD apparatus is diffused by the concave lens, then reflected by the reflecting mirrors, and concentrated and applied onto the laser light path region of the slab-shaped crystal and the neighborhood thereof, whereby a concentrated applied light intensity distribution in the side surface width direction of the slab-shaped crystal is formed as a double-peak distribution having maximum values at opposite end portions of the laser light path region of the slab-shaped crystal, or in the neighborhoods thereof.

According to this invention, semiconductor laser light is concentrated and applied onto the laser light path region and its neighborhood. Thus, the utilization efficiency of the semiconductor laser light is increased, and when the same solid state laser output as before is to be obtained, the semiconductor laser output (input to the crystal) can be made smaller than before. In other words, when the same semiconductor laser output as before is given, a greater solid state laser output than before can be obtained.

Furthermore, the concentrated applied light intensity distribution in the side surface width direction of the crystal is formed as a double-peak distribution having the maximum values at the opposite end portions of the laser light path region of the crystal, or in their neighborhoods. Thus, the temperature distribution in the side surface width direction within the crystal is a uniform distribution in the laser light path region. According to this temperature distribution, the refractive index distribution in the side surface width direction within the crystal is also a uniform distribution in the laser light path region. Consequently, the solid state laser light is prevented from being condensed or contorted in the solid state laser light paths within the crystal owing to the thermal lens effect, so that the quality of the solid state laser light is improved.

5) A solid state laser apparatus having an LD apparatus as an exciting light source, and adapted to direct laser light emitted from the LD apparatus, as exciting light, at the side surface of a slab-shaped crystal to emit solid state laser light, comprising:
   a duct lens formed such that the base end surface thereof facing the LD apparatus is a concave surface, the surfaces thereof opposed to each other in the side surface width direction of the slab-shaped crystal are reflecting surfaces, and the spacing between the reflecting surfaces in the side surface width direction gradually narrows from a base end portion of the duct lens facing the LD apparatus toward a front end portion of the duct lens facing the slab-shaped crystal and, at the front end surface of the duct lens, becomes a width corresponding to a laser light path region of the slab-shaped crystal and the neighborhood thereof, and wherein
   the laser light emitted from the LD apparatus is concentrated and applied by the duct lens onto the laser light path region of the slab-shaped crystal and the neighborhood thereof, whereby a concentrated applied light intensity distribution in the side surface width direction of the slab-shaped crystal is formed as a double-peak distribution having maximum values at opposite end portions of the laser light path region of the slab-shaped crystal or in the neighborhoods thereof.

According to this invention, semiconductor laser light is concentrated and applied onto the laser light path region and its neighborhood. Thus, the utilization efficiency of the semiconductor laser light is increased, and when the same solid state laser output as before is to be obtained, the semiconductor laser output (input to the crystal) can be made smaller than before. In other words, when the same semiconductor laser output as before is given, a greater solid state laser output than before can be obtained.

Furthermore, the concentrated applied light intensity distribution in the side surface width direction of the crystal is formed as a double-peak distribution having the maximum values at the opposite end portions of the laser light path region of the crystal, or in their neighborhoods. Thus, the temperature distribution in the side surface width direction within the crystal is a uniform distribution in the laser light path region. According to this temperature distribution, the refractive index distribution in the side surface width direction within the crystal is also a uniform distribution in the laser light path region. Consequently, the solid state laser light is prevented from being condensed or contorted in the solid state laser light paths within the crystal owing to the thermal lens effect, so that the quality of the solid state laser light is improved.

6) A solid state laser apparatus having an LD apparatus as an exciting light source, and adapted to direct laser light emitted from the LD apparatus, as exciting light, at the side surface of a slab-shaped crystal to emit solid state laser light, wherein:
   a plurality of cylindrical lenses are arranged parallel such that the longitudinal direction thereof is along the longitudinal direction of the slab-shaped crystal; and
   the laser light emitted from the LD apparatus is concentrated and applied by the cylindrical lenses onto a laser light path region of the slab-shaped crystal and the neighborhood thereof, whereby a concentrated applied light intensity distribution in the side surface width direction of the slab-shaped crystal is formed as a double-peak distribution having maximum values at opposite end portions of the laser light path region of the slab-shaped crystal or in the neighborhoods thereof.

According to this invention, semiconductor laser light is concentrated and applied onto the laser light path region and its neighborhood. Thus, the utilization efficiency of the semiconductor laser light is increased, and when the same solid state laser output as before is to be obtained, the semiconductor laser output (input to the crystal) can be made smaller than before. In other words, when the same semiconductor laser output as before is given, a greater solid state laser output than before can be obtained.

Furthermore, the concentrated applied light intensity distribution in the side surface width direction of the crystal is formed as a double-peak distribution having the maximum values at the opposite end portions of the laser light path region of the crystal, or in their neighborhoods. Thus, the temperature distribution in the side surface width direction within the crystal is a uniform distribution in the laser light path region. According to this temperature distribution, the refractive index distribution in the side surface width direction within the crystal is also a uniform distribution in the laser light path region. Consequently, the solid state laser light is prevented from being condensed or contorted in the solid state laser light paths within the crystal owing to the thermal lens effect, so that the quality of the solid state laser light is improved.

BEST MODE FOR CARRYING OUT THE INVENTION

Embodiments of the present invention will be described in detail with reference to the accompanying drawings.

[First Embodiment]

Figure 1:
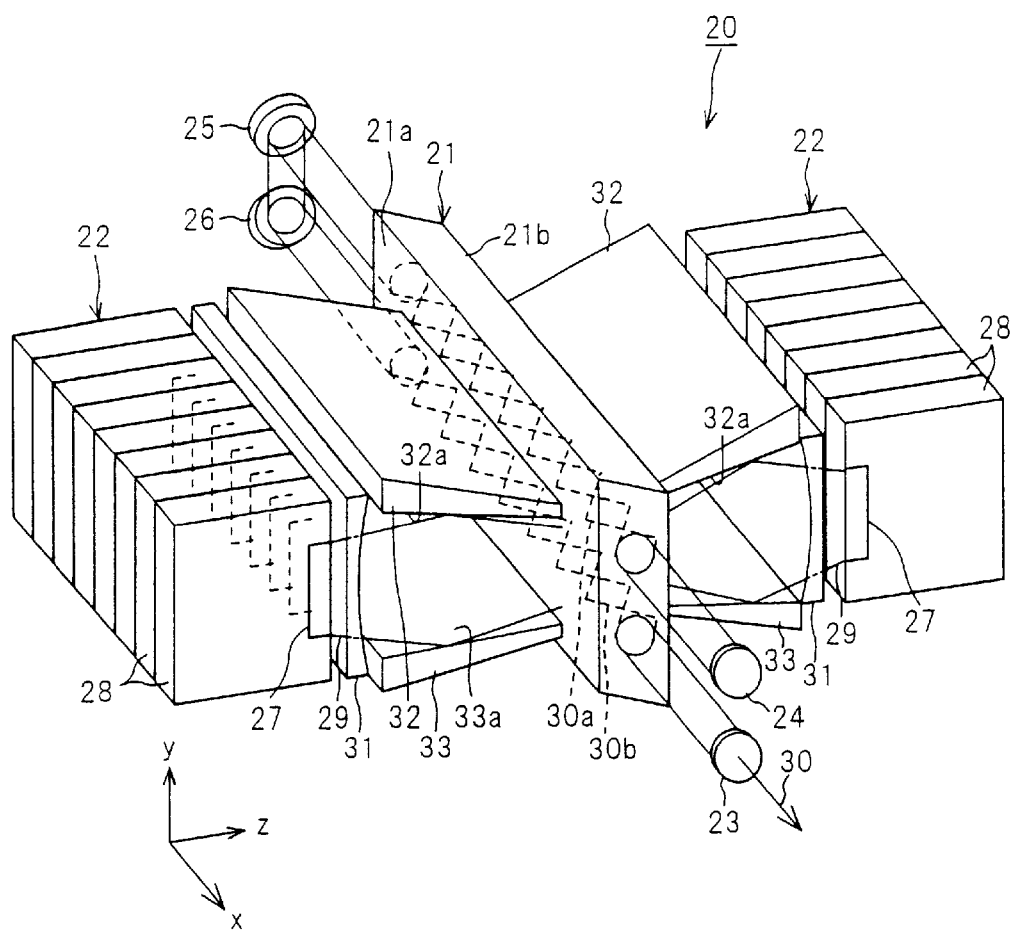
FIG. 1 is a perspective view showing the configuration of a YAG laser apparatus according to a first embodiment of the present invention.
Figure 2:
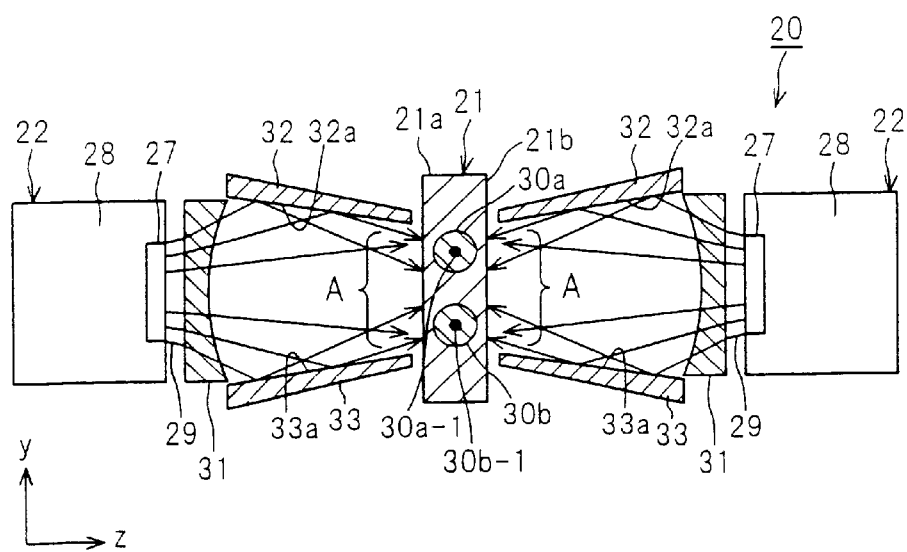
FIG. 2 is a cross sectional view of the YAG laser apparatus shown in FIG. 1.
Figure 3:
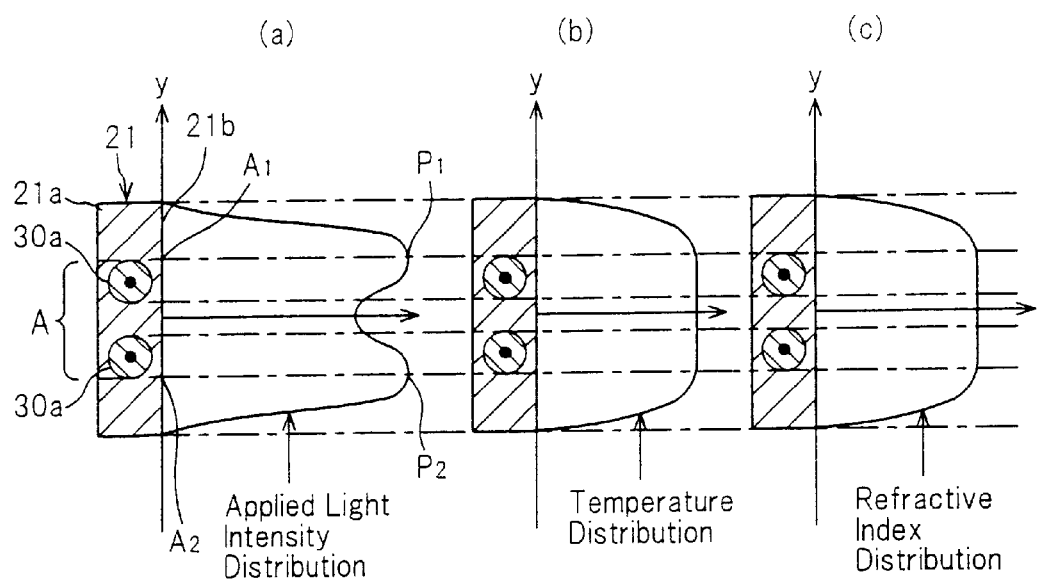
FIGS. 3(a) to 3(c) are explanation drawings showing the concentrated applied light intensity distribution, temperature distribution, and refractive index distribution in the side surface width direction of the aforementioned slab-shaped YAG crystal.

FIG. 1 is a perspective view showing the configuration of a YAG laser apparatus according to a first embodiment of the present invention. FIG. 2 is a cross sectional view of the above YAG laser apparatus. FIGS. 3(a) to 3(c) are explanation drawings showing the concentrated applied light intensity distribution, temperature distribution, and refractive index distribution in the side surface width direction of the slab-shaped YAG crystal of the above YAG laser apparatus.

As shown FIGS. 1 and 2, a YAG laser apparatus 20, a solid state laser apparatus, has a pair of LD apparatuses 22 as an exciting light source, and these LD apparatuses 22 are disposed so as to be opposed to both side surfaces 21a and 21b of a slab-shaped YAG crystal (hereinafter referred to simply as a crystal) 21. An output mirror 23 and a total reflection mirror 24 are provided parallel on one side in the longitudinal direction (x-axis direction) of the crystal 21, while a turnback total reflection mirror 25 and a turnback total reflection mirror 26 are provided parallel on the other side in the longitudinal direction of the crystal 21. These mirrors 23, 24, 25 and 26 constitute a resonator. The illustrated example shows a YAG laser light path in the crystal as two axes, a YAG laser light path 30a and a YAG laser light path 30b (laser light axes 30a-1 and 30b-1).

The LD apparatus 22 comprises many cooling blocks 28 stacked in the x-axis direction, each of the cooling blocks 28 having an LD device 27 fixed to the side surface thereof. A water channel (not shown) for flowing cooling water, which cools the LD device 27, is formed in the cooling block 28. The LD device 27 used here comprises several tens of active media arranged one-dimensionally (i.e., a one-dimensional LD array device), each of the active media having a cross sectional area of several micrometers×several hundred micrometers. The LD devices 27 are stacked, together with the cooling blocks 28, to constitute a two-dimensional LD array device.

By flowing a drive current in the stack direction of the cooling blocks 28 by a power source device (not shown), semiconductor laser light 29 is emitted from the respective LD devices 27, and this laser light 29 is directed, as exciting light, at the opposite side surfaces 21a and 21b of the crystal 21. As a result, the laser medium doped into the crystal is excited, whereby YAG laser light 30 is issued from the output mirror 23 of the resonator.

At this time, the YAG laser light paths 30a, 30b in the crystal are zigzag optical paths, in which laser light advances in the x-axis direction while being reflected by the opposite side surfaces 21a and 21b in the thickness direction (z-axis direction) of the crystal 21, because the entrance and exit of the crystal 21 (the opposite end surfaces in the x-axis direction) have Brewster's angle. Thus, even if a temperature distribution occurs in the z-axis direction inside the crystal and a refractive index distribution according to this temperature distribution occurs, a thermal lens effect due to this phenomenon is compensated for.

An concave lens 31 and a pair of reflecting mirrors, 32 and 33, are interposed between the LD apparatus 22 and the crystal 21.

The concave lens 31 is disposed ahead of the LD apparatus 22, and diffuses semiconductor laser light 29, emitted from the LD apparatus 22, in the side surface width direction (y-axis direction) of the crystal 21. The pair of reflecting mirrors 32 and 33 are interposed between the concave lens 31 and the crystal 21, and have reflecting surfaces 32a and 33a opposed to each other in the y-axis direction. The spacing between these reflecting surfaces 32a and 33a in the y-axis direction gradually narrows from base end portions of the reflecting mirrors facing the concave lens toward front end portions of the reflecting mirrors facing the crystal and, at the front ends of the reflecting mirrors, becomes a spacing corresponding to a laser light path region A of the crystal 21 and its neighborhood.

That is, semiconductor laser light 29 emitted from the LD apparatus 22 is diffused by the concave lens 31, and then reflected by the reflecting mirrors 32, 33, whereby the laser light 29 is concentrated and applied onto the laser light path region A of the crystal 21 and its neighborhood. According to this feature, as shown in FIG. 3(a), the concentrated applied light intensity distribution in the y-axis direction on the side surfaces 21a, 21b of the crystal 21 is a double-peak distribution having maximum values $P_1$ and $P_2$ at opposite end portions $A_1$ and $A_2$ of the laser light path region A of the crystal, or in their neighborhoods.

FIG. 3(a) shows the presence of the maximum values $P_1$ and $P_2$ at the opposite end portions $A_1$ and $A_2$ of the laser light path region A. However, there is a case in which the maximum values $P_1$ and $P_2$ are present in the neighborhoods of the opposite end portions $A_1$ and $A_2$, and the optimum positions may be suitably set based on analysis or experiments. In either case, the concentrated applied light intensity distribution in the y-axis direction on the side surfaces 21a, 21b of the crystal 21 is neither a double-peak distribution having the maximum values $P_1$ and $P_2$ at the centers of the cross sections of the YAG laser light paths 30a and 30b (i.e., the laser light axes 30a-1 and 30b-1), nor a single-peak distribution having a maximum value midway between the laser light path 30a and the laser light path 30b, but is a double-peak distribution having the maximum values $P_1$ and $P_2$ at the opposite end portions $A_1$ and $A_2$ of the laser light path region A, or in their neighborhoods.

As a result, decreases in the light intensities at the opposite end portions $A_1$ and $A_2$ of the laser light path region A, compared with the light intensity at the center of the laser light path region A, due to heat conduction can be compensated for. Thus, as shown in FIG. 3(b), the temperature distribution in the y-axis direction within the crystal is a uniform distribution in the laser light path region A. According to this temperature distribution, the refractive index distribution in the y-axis direction within the crystal is also a uniform distribution in the laser light path region A, as shown in FIG. 3(c).

According to the present embodiment, as described above, the semiconductor laser light 29 is concentrated and applied onto the laser light path region A and its neighborhood. Thus, the utilization efficiency of the semiconductor laser light 29 is increased, and when the same YAG laser output as before is to be obtained, the semiconductor laser output (input to the crystal) can be made smaller than before. In other words, when the same semiconductor laser output as before is given, a greater YAG laser output than before can be obtained.

Furthermore, the concentrated applied light intensity distribution in the y-axis direction of the crystal 21 is a double-peak distribution having the maximum values $P_1$ and $P_2$ at the opposite end portions $A_1$ and $A_2$ of the laser light path region A of the crystal 21, or in their neighborhoods. Thus, the temperature distribution in the y-axis direction within the crystal is a uniform distribution in the laser light path region A. According to this temperature distribution, the refractive index distribution in the y-axis direction within the crystal is also a uniform distribution in the laser light path region A. Consequently, the YAG laser light 30 is prevented from being condensed or contorted in the YAG laser light paths 30a, 30b within the crystal owing to the thermal lens effect, so that the quality of the YAG laser light 30 is improved.

Figure 4:
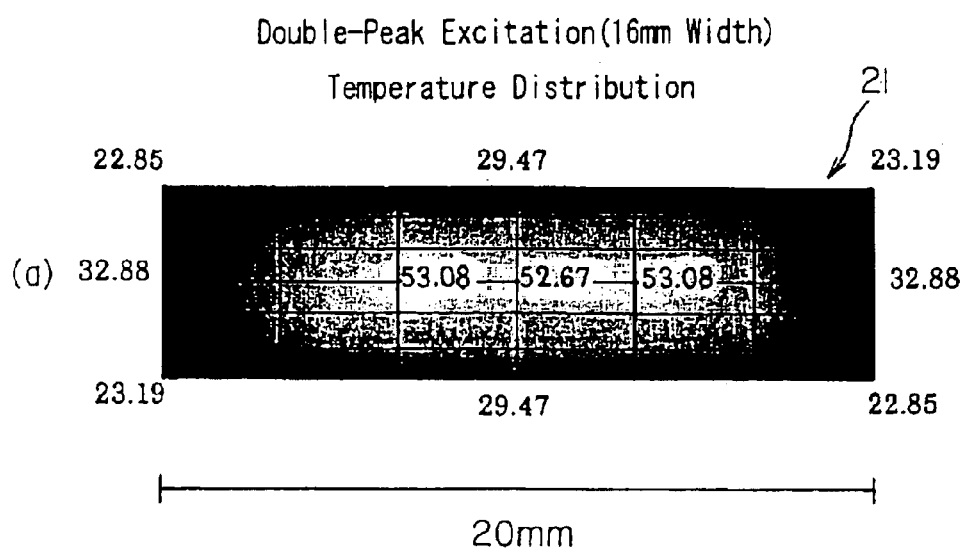
FIGS. 4(a) and 4(b) are a temperature contour view and a refractive index contour view showing the results of analysis made when laser light is concentrated and applied so that a concentrated applied light intensity distribution will be a double peak distribution.
Figure 4:
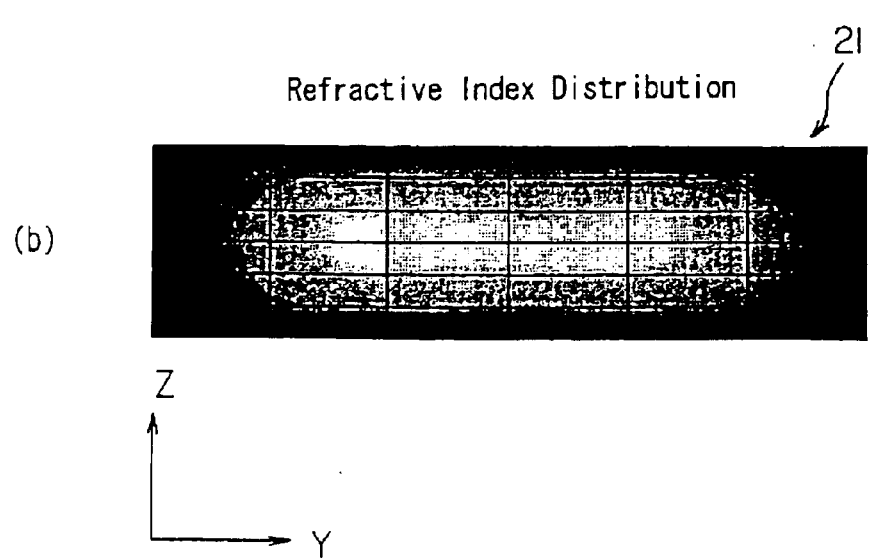

FIGS. 4(a) and 4(b) show an example of analysis made when laser light is concentrated and applied such that the concentrated applied light intensity distribution is a double-peak distribution (i.e., laser light is applied onto a 16 mm width relative to the crystal width of 20 mm). In these drawings, the differences in color density represent differences in temperature, and the numerical values in the drawings represent temperatures (° C.). As shown in FIG. 4(a), the temperature distribution in the y-axis direction within the crystal is a uniform distribution in the laser light path region. According to this temperature distribution, the refractive index distribution in the y-axis direction within the crystal is also a uniform distribution in the laser light path region, as shown in FIG. 4(b).

The above descriptions show the laser light path within the crystal as two axes, but needless to say, this is not restrictive. The invention according to the present embodiment 1 can be applied to the laser light path of a single axis or three or more axes.

Figure 5:
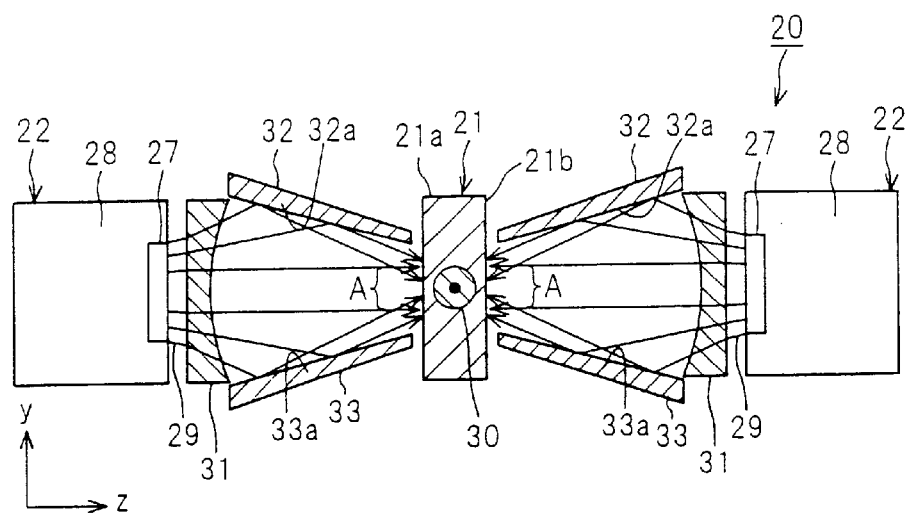
FIG. 5 is a cross sectional view showing the configuration of the YAG laser apparatus with a one-axis laser light path.
Figure 6:
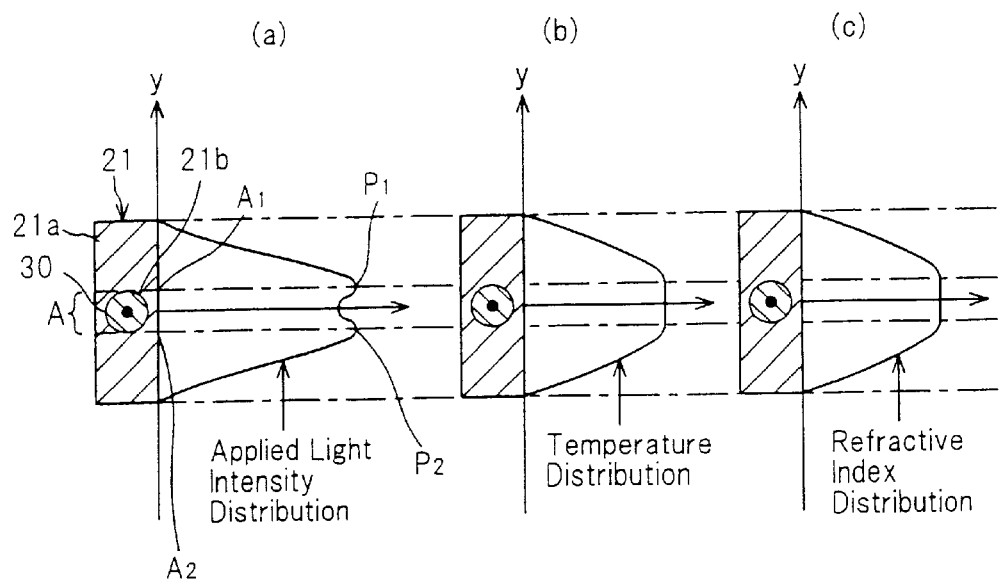
FIGS. 6(a) to 6(c) are explanation drawings showing the concentrated applied light intensity distribution, temperature distribution, and refractive index distribution in the side surface width direction of the slab-shaped YAG crystal of the above-described YAG laser apparatus.

FIG. 5 shows a one-axis laser light path. In this case as well, as shown in FIG. 6(a), the concentrated applied light intensity distribution in the y-axis direction on the side surfaces 21a, 21b of the crystal 21 is a double-peak distribution having the maximum values $P_1$ and $P_2$ at the opposite end portions $A_1$ and $A_2$ of the laser light path region A of the crystal 21, or in their neighborhoods. Thus, as shown in FIG. 6(b), the temperature distribution in the y-axis direction within the crystal is a uniform distribution in the laser light path region A. According to this temperature distribution, the refractive index distribution in the y-axis direction within the crystal is also a uniform distribution in the laser light path region A, as shown in FIG. 6(c).

Figure 15:
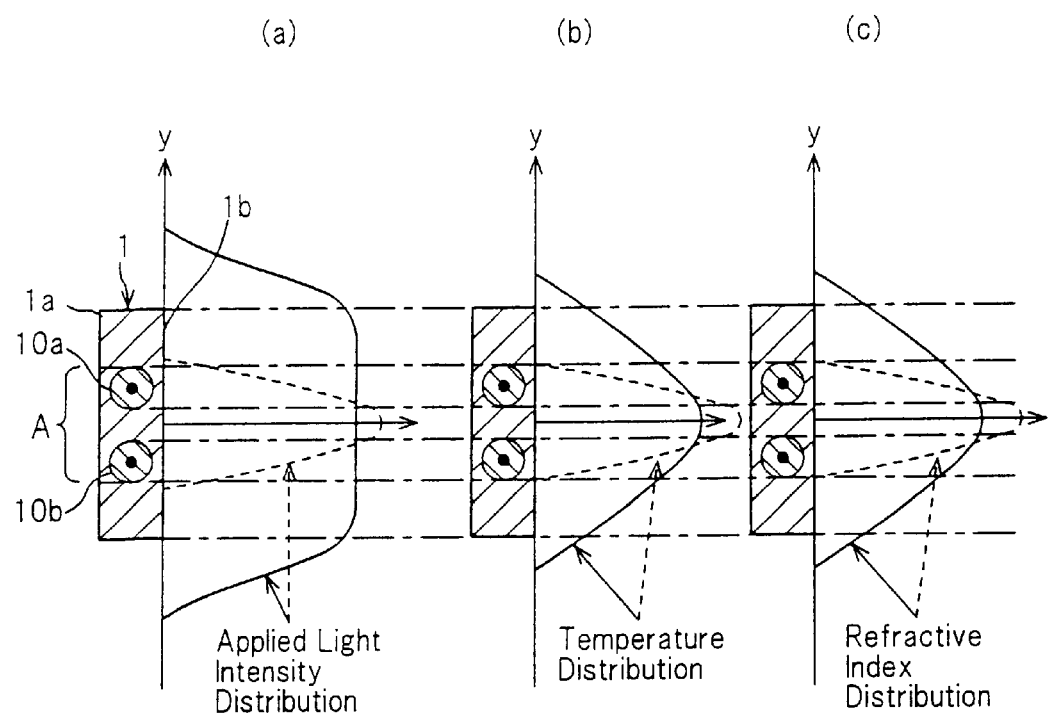
FIGS. 15(a) to 15(c) are explanation drawings showing the concentrated applied light intensity distribution, temperature distribution, and refractive index distribution in the side surface width direction of a slab-shaped YAG crystal, in cases in which a semiconductor laser is applied uniformly to the entire side surface of the slab-shaped YAG crystal, and the semiconductor laser is concentrated and applied onto a laser light path region of the slab-shaped YAG crystal, and its neighborhood.

Also, laser light is concentrated by suitable light concentrating/applying means to achieve a concentrated applied light intensity distribution having a maximum value at the center in the y-axis direction in the laser light path region A, as indicated by dashed lines in FIG. 15(a). This measure improves the utilization efficiency of a semiconductor laser over the earlier technologies. In this case, however, the temperature distribution is also a distribution having a maximum value at the center in the y-axis direction in the laser light path region A, as indicated by dashed lines in FIG. 15(b). According to this temperature distribution, the refractive index distribution is also a distribution having a maximum value at the center in the y-axis direction in the laser light path region A, as indicated by dashed lines in FIG. 15(c).

Figure 16:
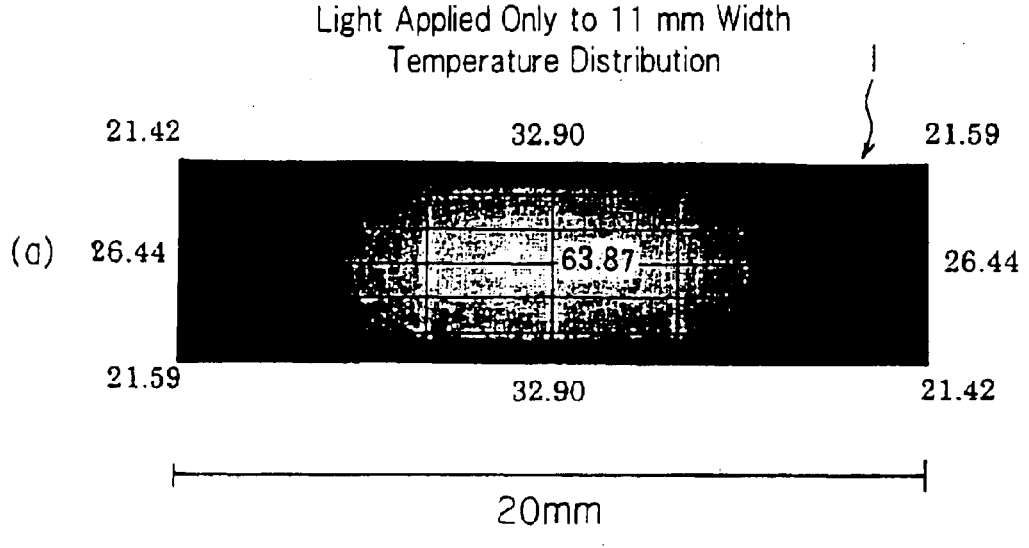
FIGS. 16(a) and 16(b) are a temperature contour view and a refractive index contour view showing the results of analysis made when semiconductor laser light is concentrated and applied.
Figure 16:
Figure 16:
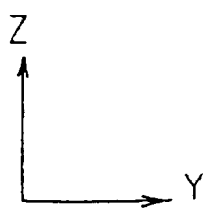

FIGS. 16(a) and 16(b) show an example of analysis made when semiconductor laser light is concentrated and applied only to an 11 mm width. In this case, the temperature distribution is a distribution having a maximum value at the center in the y-axis direction in the laser light path region, as shown in FIG. 16(a). According to this temperature distribution, the refractive index distribution is also a distribution having a maximum value at the center in the y-axis direction in the laser light path region, as shown in FIG. 16(b).

In the above examples, the concave lens 31 is used to diffuse the semiconductor laser light 29 once. However, if the spacing between the LD apparatus 22 and the crystal 21 is widened so that the semiconductor laser light 29 will spread fully, the concave lens need not be used, and the use of the reflecting mirrors alone suffices. In this case, however, the apparatus is upsized, and the semiconductor laser light attenuates greatly by the time it arrives at the crystal. In other words, these problems are solved by using the concave lens 31. In addition, the acquisition of an LD apparatus, which can emit laser light with a sufficiently large spread angle, would be able to bring the LD apparatus and the crystal close to each other, even with the use of the reflecting mirrors alone without the use of the concave lens. Thus, upsizing of the apparatus would not be induced.

[Second Embodiment]

Figure 7:
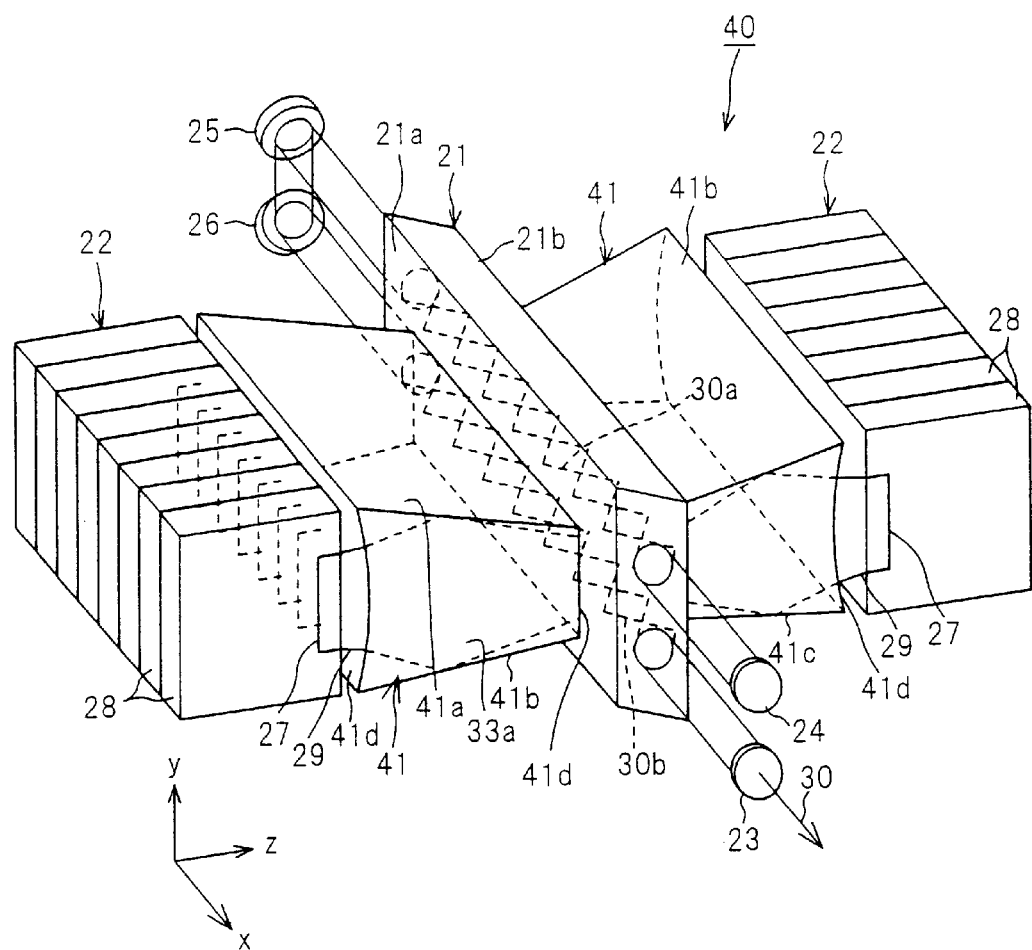
FIG. 7 is a perspective view showing the configuration of a YAG laser apparatus according to a second embodiment of the present invention.
Figure 8:
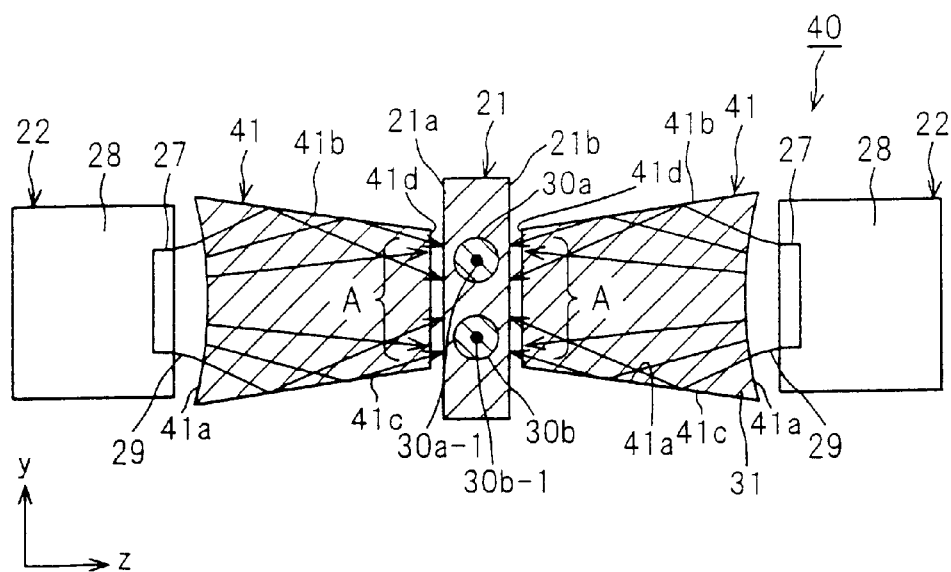
FIG. 8 is a cross sectional view of the above YAG laser apparatus.

FIG. 7 is a perspective view showing the configuration of a YAG laser apparatus according to a second embodiment of the present invention. FIG. 8 is a cross sectional view of the above YAG laser apparatus.

As shown in FIGS. 7 and 8, a YAG laser apparatus 40 according to the present embodiment has a lens duct 41 interposed, as light concentrating/applying means, between an LD apparatus 22 and a slab-shaped YAG crystal 21.

The lens duct 41 is a quartz lens whose base end surface 41a facing the LD apparatus is a concave surface, and whose surfaces 41b and 41c opposed to each other in the y-axis direction are reflecting surfaces each provided with a reflective coating such as gold coating. The spacing between these reflecting surfaces 41b and 41c in the y-axis direction gradually narrows from a base end portion of the lens duct facing the LD apparatus toward a front end portion of the lens duct facing the crystal and, at the front end surface 41d of the lens duct, becomes a width corresponding to a laser light path region A of the crystal 21 and its neighborhood.

That is, laser light 29 emitted from the LD apparatus 22 is concentrated and applied by the lens duct 41 to the laser light path region A of the crystal 21 and its neighborhood. According to this feature, the concentrated applied light intensity distribution in the y-axis direction on the side surfaces 21a, 21b of the crystal 21 is a double-peak distribution having maximum values at opposite end portions of the laser light path region A of the crystal 21, or in their neighborhoods (see FIGS. 3(a) to 3(c)).

Other components are the same as in the aforementioned first embodiment. Thus, they will be assigned the same numerals, and their detailed descriptions omitted.

In the present embodiment, the same actions and effects as in the first embodiment are obtained. That is, the laser light 29 is applied onto the laser light path region A and its neighborhood. Thus, the utilization efficiency of the semiconductor laser light 29 is increased, and when the same YAG laser output as before is to be obtained, the semiconductor laser output (input to the crystal) can be made smaller than before. In other words, when the same semiconductor laser output as before is given, a greater YAG laser output than before can be obtained.

Furthermore, the concentrated applied light intensity distribution in the y-axis direction of the crystal 21 is a double-peak distribution having the maximum values at the opposite end portions of the laser light path region A of the crystal 21, or in their neighborhoods. Thus, the temperature distribution in the y-axis direction within the crystal is a uniform distribution in the laser light path region A. According to this temperature distribution, the refractive index distribution in the y-axis direction within the crystal is also a uniform distribution in the laser light path region A. Consequently, YAG laser light 30 is prevented from being condensed or contorted in YAG laser light paths 30a, 30b within the crystal owing to the thermal lens effect, so that the quality of the YAG laser light 30 is improved.

The invention according to the present second embodiment is not restricted to the two-axis laser light path, but can also be applied to the laser light path of a single axis or three or more axes, although this is not illustrated.

[Third Embodiment]

Figure 9:
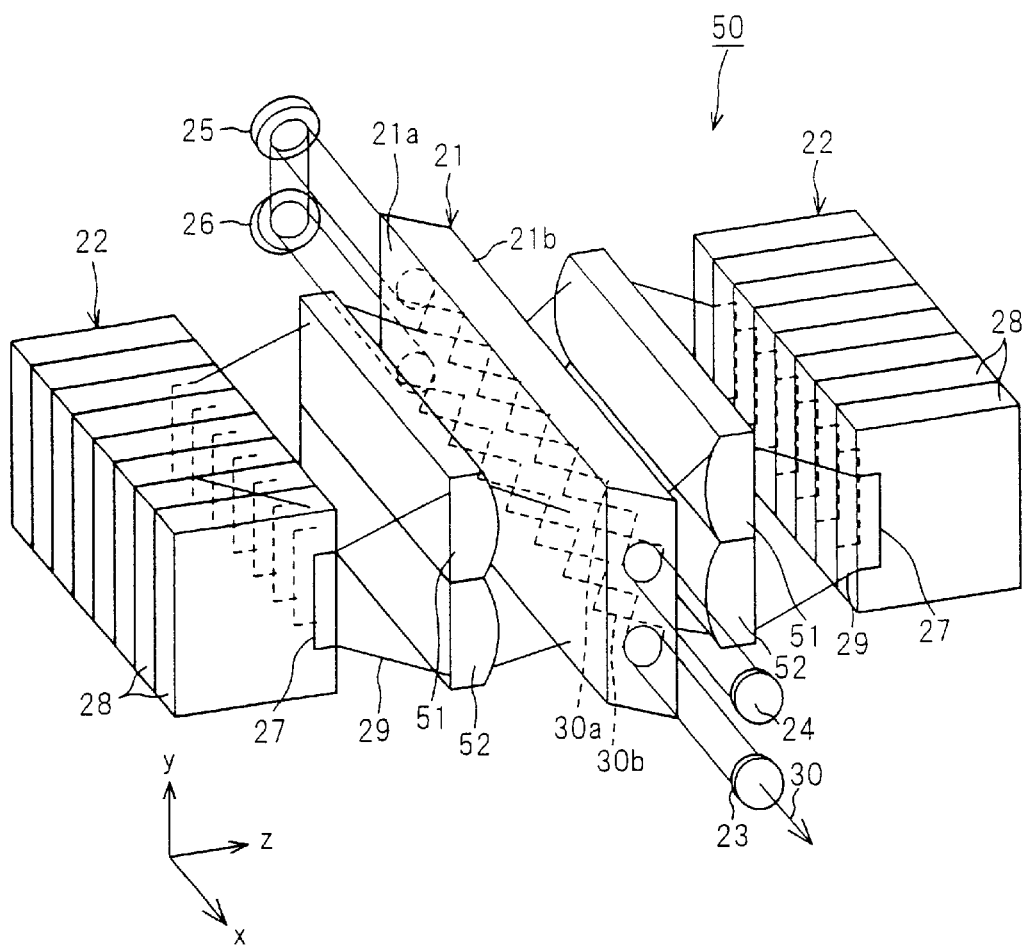
FIG. 9 is a perspective view showing the configuration of a YAG laser apparatus according to a third embodiment of the present invention.
Figure 10:
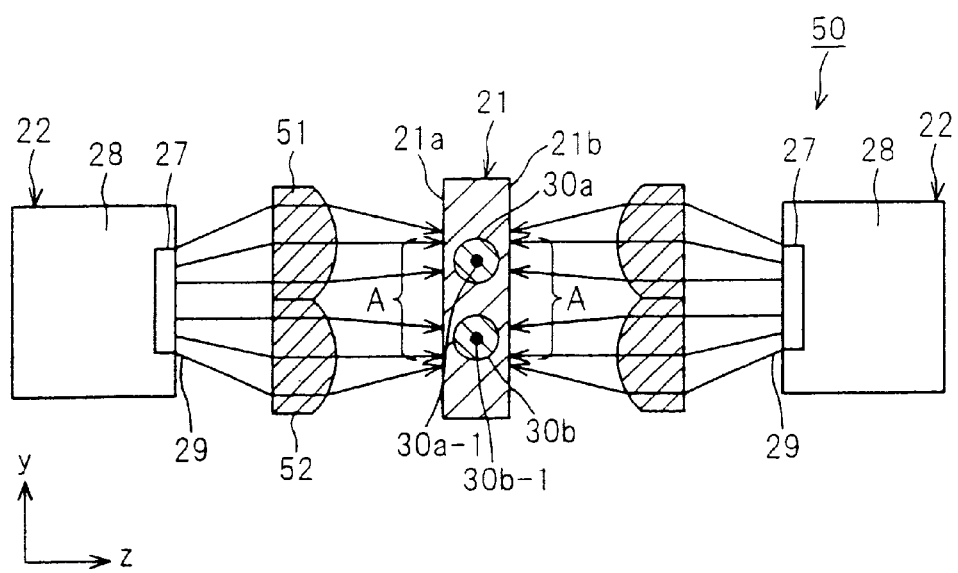
FIG. 10 is a cross sectional view of the above YAG laser apparatus.
Figure 11:
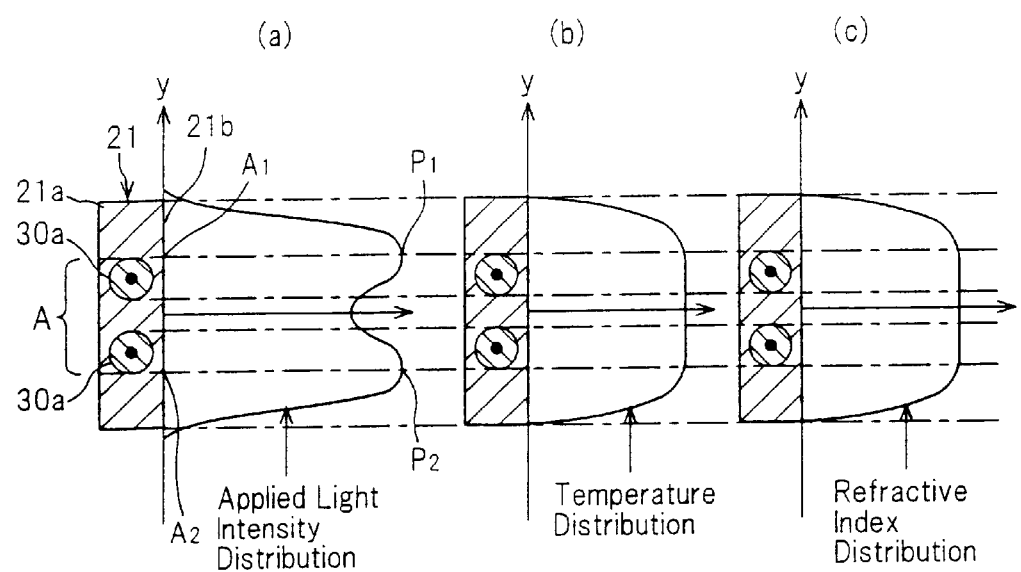
FIGS. 11(a) to 11(c) are explanation drawings showing the concentrated applied light intensity distribution, temperature distribution, and refractive index distribution in the side surface width direction of the slab-shaped YAG crystal of the above-described YAG laser apparatus.

FIG. 9 is a perspective view showing the configuration of a YAG laser apparatus according to a third embodiment of the present invention. FIG. 10 is a cross sectional view of the above YAG laser apparatus. FIGS. 11(a) to 11(c) are explanation drawings showing the concentrated applied light intensity distribution, temperature distribution, and refractive index distribution in the side surface width direction of a slab-shaped YAG crystal of the above-described YAG laser apparatus.

In a YAG laser apparatus 50 according to the present third embodiment, as shown in FIGS. 9 and 10, two cylindrical lenses 51 and 52 are interposed, as light concentrating/applying means, between an LD apparatus 22 and a slab-shaped YAG crystal 21. The cylindrical lenses 51, 52 are in a semicylindrical form.

The cylindrical lenses 51, 52 are arranged parallel such that their longitudinal direction (y-axis direction) is along the longitudinal direction (y-axis direction) of the crystal 21. Laser light 29 emitted from the LD apparatus 22 is concentrated and applied by these cylindrical lenses 51 and 52 onto a laser light path region A of the crystal 21 and its neighborhood. According to this feature, as shown in FIG. 11(a), the concentrated applied light intensity distribution in the y-axis direction on the side surfaces 21a, 21b of the crystal 21 is a double-peak distribution having maximum values $P_1$ and $P_2$ at opposite end portions $A_1$ and $A_2$ of the laser light path region A of the crystal 21, or in their neighborhoods. The cylindrical lenses are not limited in number to two, but their combination or focal lengths may be selected suitably, whereby the above-mentioned double-peak concentrated applied light intensity distribution can be obtained.

Forming the concentrated applied light intensity distribution as a double-peak distribution, as shown in FIG. 11(a), can compensate for decreases in the light intensities at the opposite end portions $A_1$ and $A_2$ of the laser light path region A, compared with the light intensity at the center of the laser light path region A, due to heat conduction. Thus, as shown in FIG. 11(b), the temperature distribution in the y-axis direction within the crystal is a uniform distribution in the laser light path region A. According to this temperature distribution, the refractive index distribution in the y-axis direction within the crystal is also a uniform distribution in the laser light path region A, as shown in FIG. 11(c).

Other components are the same as in the aforementioned first embodiment. Thus, they will be assigned the same numerals, and their detailed descriptions omitted.

According to the present third embodiment, as described above, laser light 29 is applied onto the laser light path region A and its neighborhood. Thus, the utilization efficiency of the semiconductor laser light 29 is increased, and when the same YAG laser output as before is to be obtained, the semiconductor laser output (input to the crystal) can be made smaller than before. In other words, when the same semiconductor laser output as before is given, a greater YAG laser output than before can be obtained.

Furthermore, the concentrated applied light intensity distribution in the y-axis direction of the crystal 21 is a double-peak distribution having the maximum values $P_1$ and $P_2$ at the opposite end portions $A_1$ and $A_2$ of the laser light path region A of the crystal 21, or in their neighborhoods. Thus, the temperature distribution in the y-axis direction within the crystal is a uniform distribution in the laser light path region A. According to this temperature distribution, the refractive index distribution in the y-axis direction within the crystal is also a uniform distribution in the laser light path region A. Consequently, the YAG laser light 30 is prevented from being condensed or contorted in the YAG laser light paths 30a, 30b within the crystal owing to the thermal lens effect, so that the quality of the YAG laser light 30 is improved.

The above descriptions show the laser light path within the crystal as two axes, but needless to say, this is not restrictive. The invention according to the present embodiment can also be applied to the laser light path of a single axis or three or more axes.

Figure 12:
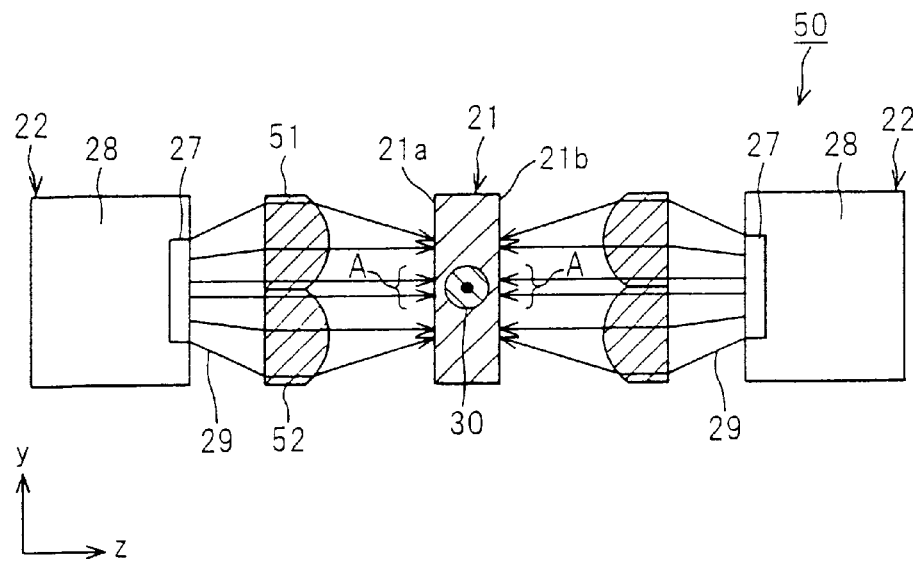
FIG. 12 is a cross sectional view showing the configuration of the YAG laser apparatus with a one-axis laser light path.
Figure 13:
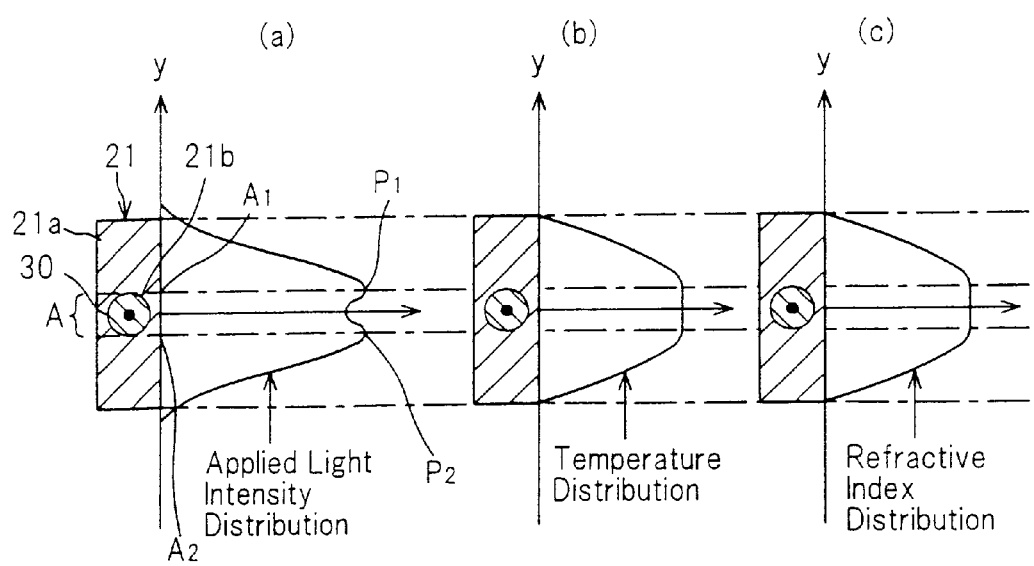
FIGS. 13(a) to 13(c) are explanation drawings showing the concentrated applied light intensity distribution, temperature distribution, and refractive index distribution in the side surface width direction of the slab-shaped YAG crystal of the above-described YAG laser apparatus.
Figure 14:
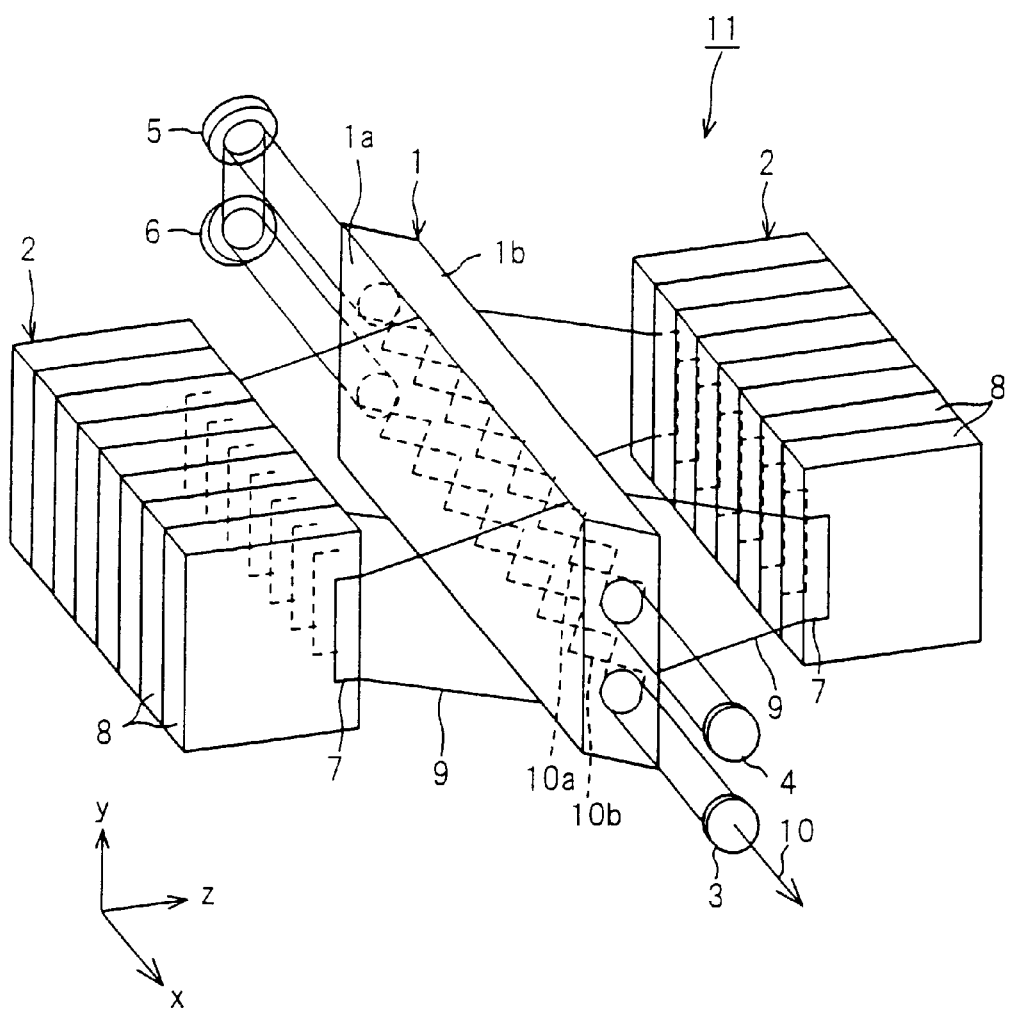
FIG. 14 is a perspective view showing the configuration of a conventional YAG laser apparatus.

FIG. 12 shows a one-axis laser light path. In this case as well, as shown in FIG. 13(a), the concentrated applied light intensity distribution in the y-axis direction on the side surfaces 21a, 21b of the crystal 21 is a double-peak distribution having the maximum values $P_1$ and $P_2$ at the opposite end portions $A_1$ and $A_2$ of the laser light path region A of the crystal 21, or in their neighborhoods. Thus, as shown in FIG. 13(b), the temperature distribution in the y-axis direction within the crystal is a uniform distribution in the laser light path region A. According to this temperature distribution, the refractive index distribution in the y-axis direction within the crystal is also a uniform distribution in the laser light path region A, as shown in FIG. 12(c).

A comparison will be made between the present embodiment and the aforementioned first embodiment. In the present embodiment, laser light is concentrated and applied by the cylindrical lenses 51, 52 onto the laser light path region A and its neighborhood. Thus, light tends to leak to the outside of this range. In the first embodiment, by contrast, laser light is concentrated and applied by the reflecting mirrors 32, 33 onto the laser light path region A and its neighborhood. Thus, light minimally leaks to the outside of this range. In this respect, the first embodiment has an advantage over the present embodiment.

According to the first to third embodiments, the concentrated applied light intensity distribution in the y-axis direction of the crystal 21 is formed by optical means as a double-peak distribution having the maximum values at the opposite end portions of the laser light path region A of the crystal 21, or in their neighborhoods. However, semiconductor laser light may be electrically controlled to obtain such a double-peak concentrated applied light intensity distribution.

INDUSTRIAL APPLICABILITY

As described above, the solid state laser apparatus of the present invention has a high utilization efficiency of semiconductor laser light, uniformizes the refractive index distribution in the side surface width direction of a slab-shaped crystal in the laser light path region of the slab-shaped crystal, and is useful for use in material processing, such as drilling, cutting or welding, and surface treatment, such as surface modification or marking.

What is claimed is:

1. A solid state laser apparatus comprising:

a crystal having a slab shape;

an LD device configured to emit a laser light; and light concentrating means for concentrating the laser light emitted from the LD device onto a laser light path region in the slab shape of the crystal or the laser light path region and a periphery thereof, wherein the laser light concentrated by the concentrating means has a light intensity distribution having a double-peak distribution.

2. A solid state laser apparatus comprising:

a crystal having a slab shape;

an LD device configured to emit a laser light; and light concentrating means for concentrating the laser light emitted from the LD device onto a laser light path region in the slab shape of the crystal or the laser light path region and a periphery thereof, wherein the laser light concentrated by the concentrating means has a light intensity distribution having a double-peak distribution, and the double-peak distribution has maximum values at opposite end portions of the laser light path region in the slab shape of the crystal or the periphery thereof.

3. A solid state laser apparatus comprising:

a crystal having a slab shape;

an LD device configured to emit a laser light;

a concave lens configured to diffuse the laser light emitted from the LD device; and a pair of reflecting mirrors having reflecting surfaces, respectively, and disposed such that the reflecting surfaces are opposed to each other, and that a spacing between the reflecting surfaces gradually narrows from base end portions of the reflecting mirrors facing the concave lens toward front end portions of the reflecting mirrors facing the slab shape of the crystal and, at the front end portions of the reflecting mirrors, becomes a spacing corresponding to a laser light path region of the slab shape of the crystal and a periphery thereof, wherein the laser light emitted from the LD device is diffused by the concave lens, then reflected by the reflecting mirrors, and concentrated and applied onto the laser light path region of the slab shape of the crystal and the periphery thereof, whereby a light intensity distribution in a side surface of the slab shape of the crystal has a double-peak distribution, and the double-peak distribution has maximum values at opposite end portions of the laser light path region of the slab shape of the crystal or the periphery thereof.

4. A solid state laser apparatus comprising:

a crystal having a slab shape;

an LD device configured to emit a laser light; and a lens duet formed such that a base end surface of the lens duct facing the LD device is a concave surface, surfaces of the lens duct opposed to each other, and a spacing between the reflecting surfaces gradually narrows from a base end portion of the lens duct facing the LD device toward a front end portion of the lens duct facing the slab shape of the crystal and, at a front end surface of the lens duct, becomes a width corresponding to a laser light path region of the slab shape of the crystal and a periphery thereof, wherein the lens duct concentrates the laser light emitted from the LD device onto the laser light path region of the slab shape of the crystal or the laser light path region and the periphery thereof, whereby a light intensity distribution in a side surface of the slab shape of the crystal has a double-peak distribution, and the double-peak distribution has maximum values at opposite end portions of the laser light path region of the slab shape of the the periphery thereof.

5. A solid state laser apparatus comprising:

a crystal having a slab shape;

an LD device configured to emit a laser light; and a plurality of cylindrical lenses arranged in parallel and longitudinally along a longitudinal direction of the slab shape of the crystal, wherein the plurality of the cylindrical lenses concentrate the laser light emitted from the LD device onto a laser light path region of the slab shape of the crystal or the laser light path region and a periphery thereof, whereby a light intensity distribution in a side surface of the slab shape of the crystal has a double-peak distribution, and the double-peak distribution has maximum values at opposite end portions of the laser light path region of the slab shape of the crystal or the periphery thereof.

* * * * *